(12) United States Patent
Wang (10) Patent No.: US 8,138,733 B2
(45) Date of Patent: Mar. 20, 2012

(54) CONTROL CIRCUIT FOR DC CONVERTER

(75) Inventor: Shu Wang, Saint Egreve (FR)

(73) Assignee: ST-Ericsson SA, Plan-les-Ouates (CH)

( * ) Notice: Subject to any disclaimer, the term of this patent is extended or adjusted under 35 U.S.C. 154(b) by 503 days.

(21) Appl. No.: 12/021,689

(22) Filed: Jan. 29, 2008

(65) Prior Publication Data

US 2008/0252279 A1    Oct. 16, 2008

(30) Foreign Application Priority Data

Jan. 30, 2007 (EP) .................................. 07300753

(51) Int. Cl.
*G05F 1/40* (2006.01)
(52) U.S. Cl. ...................... 323/283; 323/241; 323/284
(58) Field of Classification Search .................. 323/241, 323/283, 284, 285, 351
See application file for complete search history.

(56) References Cited

U.S. PATENT DOCUMENTS

| 5,631,546 A | * | 5/1997 | Heinke | 323/267 |
| 5,923,145 A | * | 7/1999 | Reichard et al. | 318/811 |
| 7,468,896 B2 | * | 12/2008 | Gong et al. | 363/21.17 |

OTHER PUBLICATIONS

Euroopean Search Report from corresponding European Application No. Ep 07300753.6, filed Jan. 30, 2007.

Allee, D.R. et al., "A Low-Cost Digital Controller for a Switching DC Converter With Improved Voltage Regulation" IEEE Power Electronics Letters, IEEE Service Center, NY, NY, US., vol. 2, No. 4, Dec. 2004, pp. 121-124.
Sluijs, F. et al., "Integrated DC/DC Converter With Digital Controller" Proceedings of the International Symposium on Low Power Electronics and Design (1998), Aug. 10, 1998, pp. 88-90.
Prodic A., "Design of a Digital PID Regulator Based on Look-Up Tables for Control of High-Frequency DC-DC Converters" Proceedings of the 2002 IEEE workshop PN Computers in Power Electronics, Jun. 3, 2002, pp. 18-22.

* cited by examiner

*Primary Examiner* — Jessica Han
(74) *Attorney, Agent, or Firm* — Wolf, Greenfield & Sacks, P.C.

(57) ABSTRACT

A method of controlling at least one transistor of a DC voltage converter to regulate an output voltage of the DC converter, the method including determining whether the output voltage of the DC converter is within a first or second voltage range, the second voltage range including a desired value of the output voltage; if the output voltage is in the first voltage range, generating a control signal using a first control method performed by a first controller, the first controller receiving the output voltage and determining the control signal based on the value of the output voltage in the first voltage range; and if the output voltage is in the second range, generating a control signal using a second control method performed by a second controller, the second controller receiving the output voltage and determining the control signal based on the value of the output voltage in the second voltage range.

44 Claims, 5 Drawing Sheets

CONTROL CIRCUIT FOR DC CONVERTER

BACKGROUND OF THE INVENTION

1. Field of the Invention

The present invention relates to control circuitry for controlling a voltage level, and in particular to control circuitry for controlling the voltage output of a DC-DC switched-mode power supply.

2. Discussion of the Related Art

DC switched mode power supplies (SMPS) are known in the art, and are used to generate a DC voltage level which is different from a supply DC voltage level of a circuit. The output voltage may be lower than the input voltage (for example in the case of a buck converter), it may be higher than the input voltage (for example in the case of a boost converter) or it may be either higher or lower (for example in the case of a buck-boost converter). Such circuits comprise a switching transistor, and the output voltage of these circuits is controlled by the duty cycle of the switching transistor.

In order to regulate the duty cycle of the switching transistor, and thus the output voltage, both analog and digital control circuits have been proposed. Digital control circuits have the advantage over analog control circuits of using less chip surface area, and are thus the preferred solution in many applications such as laptops, mobile phones, digital cameras etc.

Figure 1:
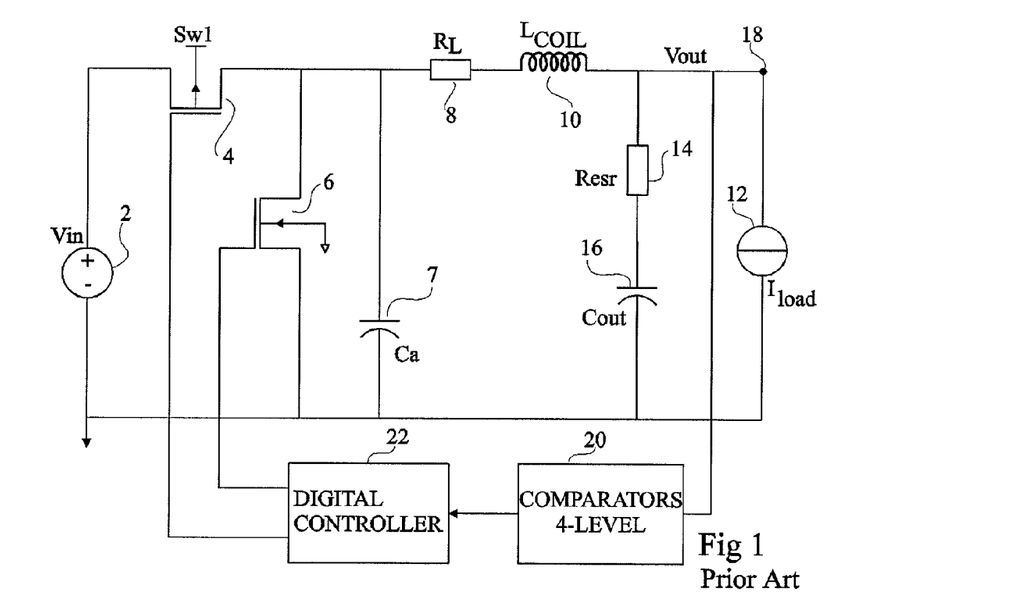
FIG. 1, described above, illustrates a known buck converter.

FIG. 1 of the present application represents FIG. 1 of the publication titled "A Low-Cost Digital Controller for a Switching DC Converter with Improved Voltage Regulation", M. Murshidul Islam et al., IEEE Power Electronics Letters, Vol. 2, No. 4, and shows an example of a buck converter. As illustrated, the converter comprises a power supply 2 connected to a switch 4, switch 4 being connected to a further switch 6, which is connected to ground, and to a resistance 8 in series with an inductor 10, resistance 8 representing the resistance of the inductor. Inductor 10 is connected to a load 12, and to resistor 14 connected in series with a capacitor 16, capacitor 16 also being connected to ground. Inductor 10 is also connected to the output node 18 of the circuit, and to a feedback path comprising a 4-level comparator 20 and a digital controller 22. Digital controller 22 provides a first output connected to a control input terminal of switch 4, and another output, complementary to the first output, connected to a control input terminal of switch 6.

In operation, during a first phase, switch 4 is turned on while switch 6 is off to provide a current flow through the inductor 10, which stores energy in the inductor. In a second phase, switch 4 is turned off, and switch 6 is turned on such that current continues to flow through inductor 10.

The output voltage can be regulated by controlling switch 4 to be on for longer or shorter periods (and controlling switch 6 in a complementary fashion), in other words by controlling the duty cycle of the control signal to each transistor. The 4-level comparator 20 determines the output voltage with respect to four voltage levels, wherein the desired voltage is between the middle two voltage levels. The digital controller operates as follows:

- if the output voltage is below all of the four voltage levels, a ramp up mode is entered in which switch 4 is turned on and remains on until the voltage is higher than the lowest voltage level;
- if the output voltage is higher than all of the voltage levels, a discontinuous mode is entered in which switch 4 is turned off to bring the output voltage down rapidly to below the highest voltage level;
- if the output voltage is outside the middle two voltage levels, by inside the outer two voltage levels, dither control is used to adjust the duty cycle; and
- if the output voltage is between these middle two levels, the duty cycle of the control signals remains unchanged.

The described control method has several of disadvantages. Firstly, by controlling the circuit to be at the extremes (100% duty cycle, 0% duty cycle) when the voltage is higher or lower than all of the voltage levels, there is a high risk of overshoot as the dithering portions of the circuit will tend to respond too slowly to correct the duty cycle before the voltage level has traversed all of the voltage levels. This results in an unstable control system. Furthermore, such a technique cannot be applied to other types of DC voltage converters, such as boost converters, in which providing 100 percent duty cycle will not result in a maximum voltage increase.

SUMMARY OF THE INVENTION

Embodiments of the present invention aim to at least partially overcome one or more disadvantages in the prior art.

According to a first aspect of the present invention, there is provided a method of controlling at least one transistor of a DC voltage converter to regulate an output voltage of the DC converter, the method comprising: determining whether an output voltage of the DC converter is within a first or second voltage range, said second voltage range comprising a desired value of the output voltage; if said output voltage is in said first voltage range, generating a control signal using a first control method performed by a first controller, said first controller receiving the output voltage and determining the control signal based on the value of the output voltage in said first voltage range; and if said current output voltage is in said second range, generating a control signal using a second control method performed by a second controller, said second controller receiving the output voltage and determining the control signal based on the value of the output voltage in said second voltage range.

According to some embodiments of the present invention, the first control method comprises the use of at least one of: at least one look-up table; and fuzzy control.

According to some embodiments of the present invention, the first control method determines said control signal based on an error signal equal to the difference between said current voltage value and the desired value of the output voltage.

According to some embodiments of the present invention, the second control method comprises the use of dither control, comprising determining in which of a plurality of sub-ranges of said second voltage range the current output voltage falls, and performing dithering at a speed determined by said determined sub-range.

According to some embodiments of the present invention, the method further comprises pulse width modulating said control signal and providing said modulated control signal to said transistor.

According to a further aspect of the present invention, there is provided digital control circuitry arranged to generate a control signal for controlling at least one transistor of a DC voltage converter and regulating the output voltage of the DC converter, the digital control circuitry comprising: a controller determination block arranged to determine whether an output voltage is within a first or second voltage range, said second voltage range comprising a desired value of the output voltage; a first controller arranged to receive said output voltage, and to generate, if the output voltage is in said first voltage range, said control signal based on the value of the output voltage in said first voltage range, said first control block arranged to generate said control signal using a first control method; and a second control block arranged to receive said output voltage, and to generate, if the output voltage is in said second voltage range, said control signal based on the value of the output voltage in said second voltage range, said second control block arranged to generate said control signal using a second control method.

According to some embodiments of the present invention, the first controller comprises one of: at least one look-up table; and fuzzy logic, and the second controller comprises circuitry arranged to increment or decrement a parameter of said control signal.

According to some embodiments of the present invention, the second control method comprises dithering.

According to some embodiments of the present invention, the digital control circuitry further comprises a pulse width modulator arranged to pulse width modulate said control signal and to provide said control signal to said transistor.

According to a further aspect of the present invention, there is provided a DC voltage converter for boosting a voltage comprising the digital control circuitry described above and at least one transistor connected to the digital control circuit.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 2:
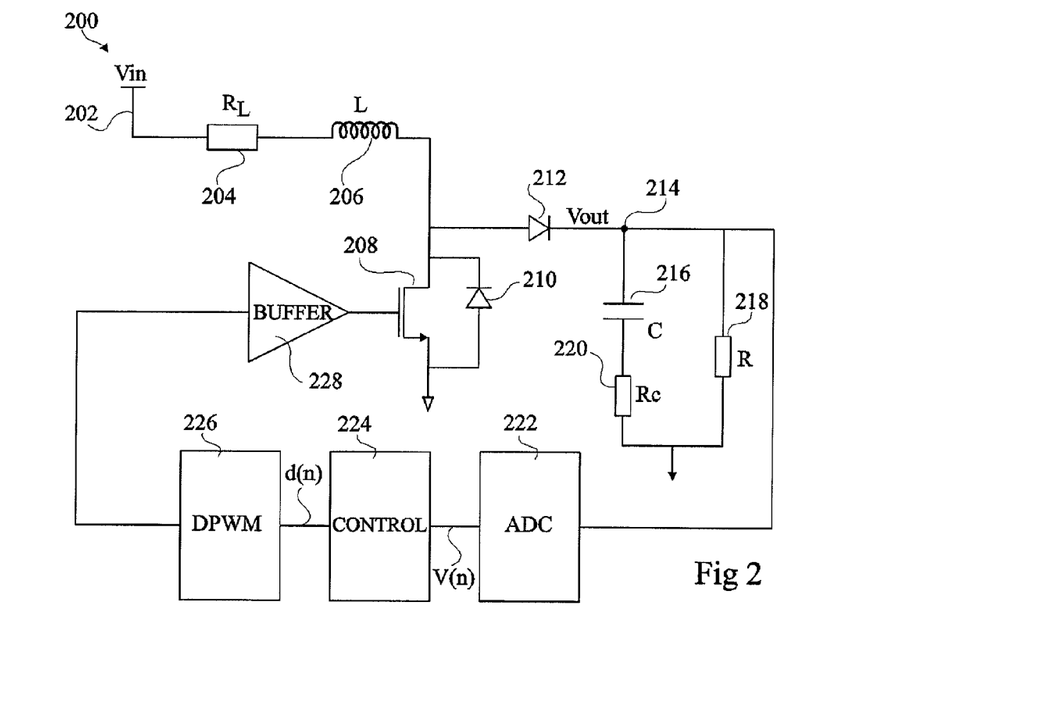
FIG. 2 is a schematic illustration of a boost converter according to an embodiment of the present invention.

FIG. 2 illustrates a boost DC voltage converter 200. As illustrated, the circuit comprises an input voltage supply at node 202, connected to one terminal of a resistor 204. The other terminal of resistor 204 is connected to one terminal of an inductor 206. Resistor 204, for example, represents the resistance of the inductor 206, which is generally formed of a coil. The other terminal of the inductor is connected to a one main current terminal of a transistor 208, in this example a MOS (metal oxide semiconductor) transistor, and to the cathode of a diode 210, which represents the internal junction of transistor 208. The inductor is also connected to the anode of a diode 212. Diode 210 has its anode connected to the other main current terminal of transistor 208, which is also connected to ground. The cathode of diode 212 is connected to an output node 214 of the circuit, and also to one terminal of a capacitor 218 and to one terminal of a resistor 218. Capacitor 216 is connected in series with a resistor 220, which is connected to ground. Resistor 220 represents the load resistance of the circuit. Resistor 218 is also connected to ground.

A feedback loop is provided from the boost circuit output node 214 to the control input terminal of transistor 208. The feedback loop comprises an analog to digital converter (ADC) 222 having an input connected to node 214, a control block 224 connected in series with the ADC, a digital pulse width modulation block (DPWM) 226 connected in series to the control block 224, and a buffer 228 connected between the DPWM block 226 and the control terminal of transistor 208.

In operation, in a first phase when switch 208 is controlled at its control input to be conducting, current flows from the voltage source node 202, through the resistor 204, the inductor 206 and transistor 208 to ground, thus storing energy in the inductor. Then, in a second phase when the transistor 208 is switched via a signal to its control input to be non-conducting, current continues to flow through the inductor 206, but now flows through diode 212 to the output node 214. Charge is thus stored, during the second phase, on capacitor 216, which in turn provides current to load resistance 220 during the subsequent first phase.

In order to regulate the output voltage level, the transistor 208 is switched by a signal having a duty cycle D, D being adjustable by the feedback loop. The ratio of the output voltage $V_o$ to the input voltage $V_{in}$ is approximately given by the following formula, assuming that the circuit is in a continuous mode of operation, implying that the current in the inductor never falls to zero, and ignoring resistances:

$$V_o/V_{in}=1/(1-D))$$

where D is the duty cycle as a value between 0 and 1, where 0 means that the switch is never conducting, and 1 means that the switch is always conducting. Thus the closer the duty cycle is to 1, the higher the output voltage. It should be noted that a duty cycle that remains very close or equal to 0 or 1 for a prolonged period is not desirable as this would result in a drop in the output voltage to a level below the input voltage.

The feedback loop operates as follows. The ADC 222 samples the output voltage $V_{out}$ at node 214 at determined time intervals, for example once every millisecond, and converts this voltage level into a digital value V(n). The digital value is, for example, 12 bits, and is stored in a register (not shown). This value is provided to control block 224, which also stores a number of pre-stored voltage ranges. These voltage ranges will be described in more detail below, and may be programmed by a user of the device. Assuming that the desired output voltage of the system is 1 V, a first voltage range is for example determined as being lower than 80 percent of the desired voltage level, in this example lower than 0.8 V, a second voltage range is for example determined as being within 20 percent of the desired voltage level, in this example between 0.8 and 1.2 V, and a third voltage range is for example determined as being for example higher than 120 percent of the desired voltage level, in this example greater than 1.2 V. In alternative embodiments, different voltage range boundaries could be provided, and a greater number or fewer voltage ranges could be defined, as will be explained in more detail herein.

The control block then processes the data using a selected control technique depending on in which range the output voltage falls. For example, if the voltage is in the first or third ranges, which are relatively far from the desired voltage, a control technique allowing fast change of the output voltage is selected, whereas if the output range is in the second voltage range, which is relatively close to the desired voltage value, a control technique is selected that is relatively stable. Each control technique controls the duty cycle based on the voltage value within the range.

There are various digital control techniques that can be used to control the duty cycle D and can be used as the control technique for each range described above. A number of examples will now be described with reference to FIGS. 3 to 5.

Figure 3:
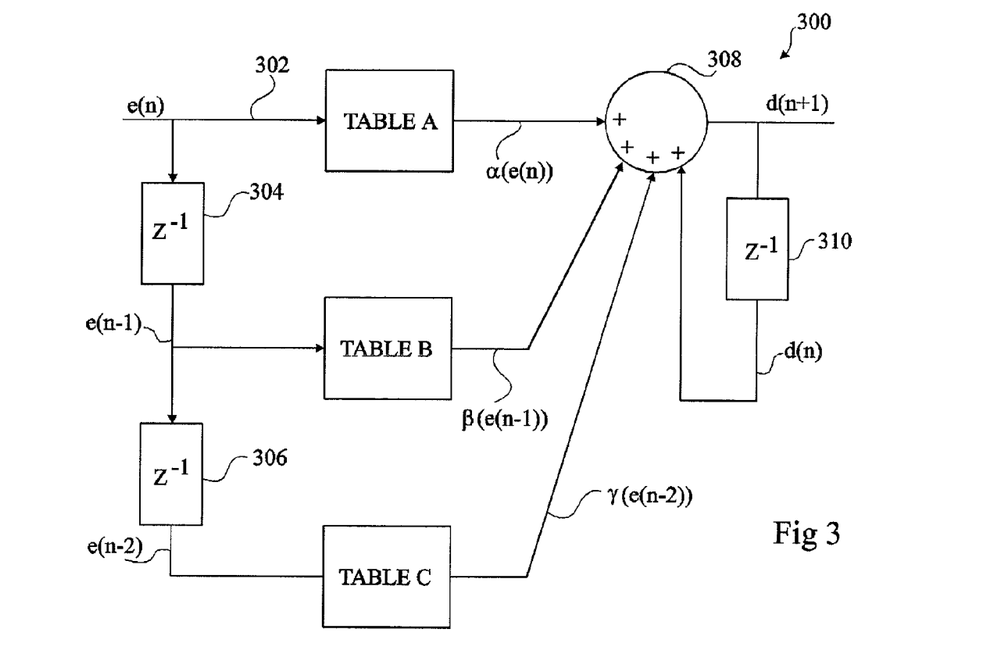
FIG. 3 schematically illustrates a look-up table feedback control circuit according to one embodiment.

FIG. 3 is a schematic illustration of a circuit 300 for controlling the duty cycle based on look-up tables. Such a circuit is for example described in more detail in the publication "Design of a Digital PID Regulator Based on Look-Up Tables for Control of High-Frequency DC-DC Converters", A. Prodic and D. Maksimovic, IEEE, which is hereby incorporated by reference to the extent allowable by the law. As illustrated in FIG. 3, in this example the circuit comprises three look-up tables A, B and C. Each table A, B, C comprises a series of possible input values, for example in the form of input ranges, and output values associated with each input value range. The circuit receives an input e(n) on line 302, which is the error between the current voltage value v(n) at the output of the converter and the desired voltage Vref stored by the system as a reference voltage.

Table A is directly connected to input 302, and generates an output $\alpha(e(n))$, this output being the value in look-up table A corresponding to the value of the input e(n). The input e(n) is also connected to a buffer 304, which stores the value of the error signal e(n) for output in a subsequent cycle. The output of buffer 304 is thus the previous value of the error signal e(n−1), which is provided as the input to table B.

Table B generates an output $\beta(e(n-1))$, this output being the value in look-up table B corresponding to the value of the input e(n−1). The signal e(n−1) is connected to another buffer 306, which stores the value of the error signal e(n−1) for output in a subsequent cycle. The output of buffer 306 is thus the value of the error signal two cycles previous, e(n−2). This error value is provided as the input to table C.

Table C generates an output $\gamma(e(n-2))$, this output being the value in look-up table B corresponding to the value of the input e(n−2).

The output from each table A, B and C is provided to an adder unit 308, which adds these outputs and a previous output value d(n) to provide an output d(n+1) of the control circuit, which is a digital value used to generate the new duty cycle signal D. The output d(n+1) is connected to a further buffer 310, which stores the value of the output d(n+1) for output in a subsequence cycle as the value d(n) provided to adder unit 308.

The transfer function of circuit 300 is thus:

$$d(n+1)=d(n)+\alpha(e(n))+\beta(e(n-1))+\gamma(e(n-2))$$

In alternative embodiments of the look-up table control circuit 300, more tables or fewer tables could be provided, and the circuit could have a higher or lower order transfer function. It will be understood that the greater the order of the transfer function, the higher the number of look-up tables that are needed, and thus the more complex and energy consuming the controller will be. If, for example, the control circuit 300 comprises only tables A and B, it could have the following simplified transfer function:

$$d(n+1)=d(n)+\alpha(e(n))+\beta(e(n-1))$$

The use of look up tables has the advantage of allowing fast rise or fall of the duty cycle and thus the output voltage.

Figure 4A:
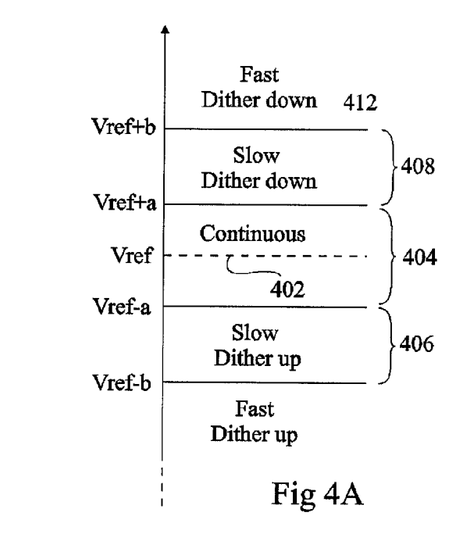
FIG. 4A is a graph illustrating voltage ranges of a dithering feedback control circuit according to one embodiment.

FIG. 4A shows a graph illustrating ranges used according to a dither control method. Dashed line 402 illustrate the reference voltage $V_{ref}$ which, as explained above, has been previously defined. A voltage range 404 is defined as between $V_{ref+a}$ and $V_{ref-a}$, in other words the boundaries falling at a value "a" above and below $V_{ref}$, where the value of "a" is for example between 0.1 and 5 percent of $V_{ref}$, and preferably approximately 2 percent of $V_{ref}$. A voltage range 406 is defined as being between $V_{ref-a}$ and $V_{ref-b}$, wherein the latter is a value "b" below $V_{ref}$, "b" for example being equal to between 10 and 20 percent below $V_{ref}$. A voltage range 408 is defined as being between $V_{ref+b}$ and $V_{ref+a}$. Voltage ranges 410 and 412 are defined as voltages below $V_{ref-b}$ and above $V_{ref+b}$ respectively.

If the output voltage falls within voltage range 404, a continuous mode of operation is entered in which the duty cycle is not adjusted. The voltage may fluctuate between the upper and lower boundaries of this range, and thus the size of this range is determined based on the desired precision of voltage converter.

If the output voltage falls within voltage range 406 or 408, slow dither up or slow dither down modes are entered respectively. Dithering means that the duty cycle is controlled over a number of consecutive cycles such that on average it has a value between two adjacent duty cycle values, and thus allows a more precise variation. Because the duty cycle is controlled by a digital control circuit, the duty cycle control signal will have a minimum graduation equal to the distance between least significant bits of the digital level. Thus dithering is used to increase or decrease the duty cycle, depending on whether the output voltage is too low or two high respectively, and this is repeated at determined intervals until the output voltage falls within voltage range 404.

If the output voltage falls in voltage ranges 410 or 412, fast dither up and fast dither down modes are entered respectively. Thus assuming that slow dither up or down changes the duty cycle by a least significant bit every 4 cycles, fast dither up or down, for example, changes the duty cycle by a least significant bit every 2 cycles.

In alternative embodiments, greater or fewer voltage ranges could be provided, voltage ranges further from the reference voltage implementing dither up or dither down at a faster rate, and voltage ranges closer to the reference voltage implementing smaller changes. Furthermore, dithering need not be used for every range. For example, in ranges further from the reference voltage, increments of decrements of one or more LSBs on successive cycles could be performed.

Figure 4B:
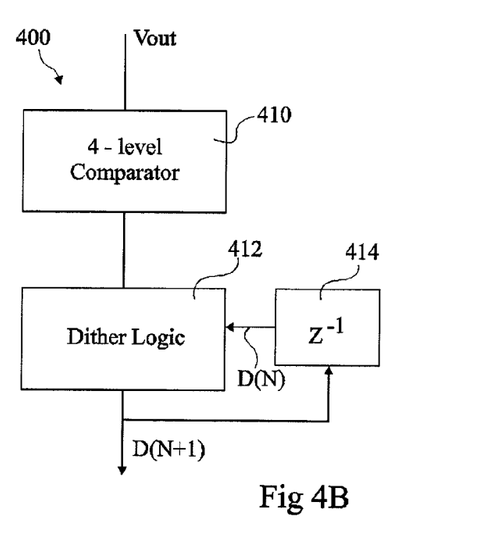
FIG. 4B illustrates an example of dither control circuitry 400 according to an embodiment.

FIG. 4B illustrates an example of dither control circuitry 400, corresponding to the example of FIG. 4A having five voltage ranges. The circuitry comprises a 4-level comparator 410, which receives the output voltage Vout from the DC converter, and determines, by comparison with the boundaries levels shown in FIG. 4A, which voltage range Vout falls in. This information is provided to a dither logic block 412, which receives a previous group of duty cycle values D(N), from a register 414, D(N) for example representing four successive duty cycle values d(n+1, d(n+2), d(n+3) and d(n+4), and provides the next group of duty cycle values D(N+1) based on the previous values and the voltage range. Thus, for example, if the previous four duty cycle values were all the same, and the voltage range is determined as fast dither up, then the duty cycle value for two of the subsequent four duty cycles is increased by an LSB, and the other two remain the unchanged, whereas if the voltage range is slow dither down, one duty cycle of the four subsequent duty cycles is decreased by a LSB, and the rest remain unchanged.

Dithering has the advantage of being a very stable control technique.

Figure 5:
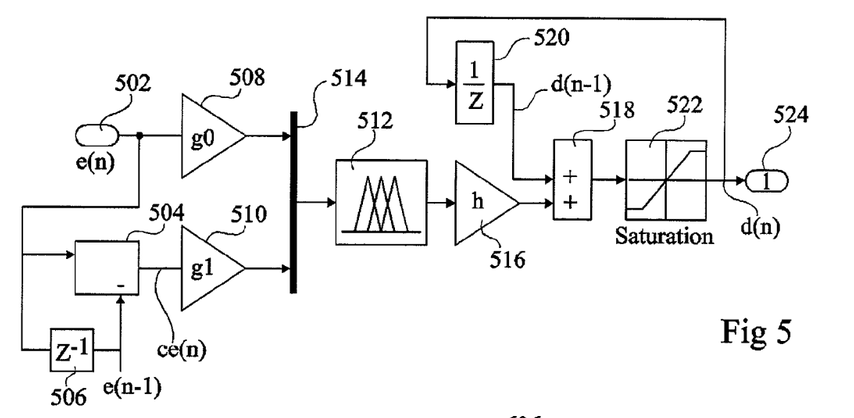
FIG. 5 schematically illustrates a fuzzy logic control circuit according to one embodiment.

FIG. 5 schematically illustrates a control circuit based on fuzzy logic. Such a fuzzy logic control circuit and alternatives are for example discussed in more detail in publication titled "Comparative Evaluation of Linear PID and Fuzzy Control for a Boost Converter", L. Guo, J. Hung, R. Nelms, IEEE, which is hereby incorporated by reference to the extent allowable by the law. The circuit of FIG. 5 receives an error signal e(n) an input node 502, as described above e(n) being the difference between the current output voltage Vout and the reference voltage. This value is provided to a subtraction unit 504 and to buffer 506, buffer 506 storing the current error signal for output as the signal e(n−1) in the subsequent cycle. Subtraction unit 504 also receives the output from buffer 506, and subtracts the signal e(n−1) from e(n) to provide an output ce(n)=e(n)−e(n−1).

The signal e(n) from input 502 is provided to a multiplier 508 which multiplies this signal by a value g0, while the signal ce(n) from subtraction unit 504 is provided to a multiplier 510 which multiplies this signal by a value g1. The outputs from the multipliers 508 and 510 are provided to a fuzzy controller 512 via a multiplexer 514. The output is scaled by a linear gain h in multiplier 516, and provided to adder block 518. Adder block adds the output from multiplier 516 to the output of a buffer 520, and provides the output to a saturation amplifier block 522, which provides the output d(n) of the controller at node 524. The output at node 524 is also provided to register 520, which stores this output until the next cycle when it is output as d(n−1).

Fuzzy logic control has the advantage of allowing fast rise and fall times.

Figure 6:
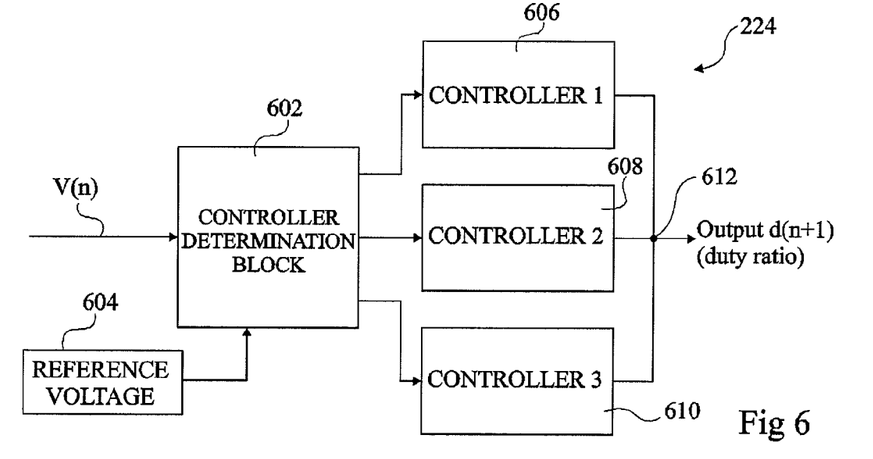
FIG. 6 schematically illustrates feedback control circuitry according to an embodiment of the present invention.

FIG. 6 illustrates the control block 224 of FIG. 2 in more detail. As illustrated, a controller determination block 602 receives the signal V(n) from ADC 222, and also the reference voltage from a register 604. Based on these inputs, the controller determines which of three controllers are to be used to provide the duty cycle output d(n+1) to the DPWM 226. According to this embodiment, the controller determination block 602 is programmed to select one of the controllers based on the difference, for example as a percentage, between the reference voltage and the current voltage V(n). In alternative embodiments, the voltage ranges in which each of the controllers is selected is provided in register 604.

The controller determination block 602 determines whether controller 606, controller 608 or controller 610, is to be used, and sends an activation signal to that controller. Depending on the controller, the controller uses the signal V(n), an error signal e(n) generated by subtracting the reference voltage from V(n), the previous one or more duty cycle values, and/or the reference voltage to determine the next duty cycle d(n+1), which is provided at an output node 612 common to all of the controllers.

Figure 7:
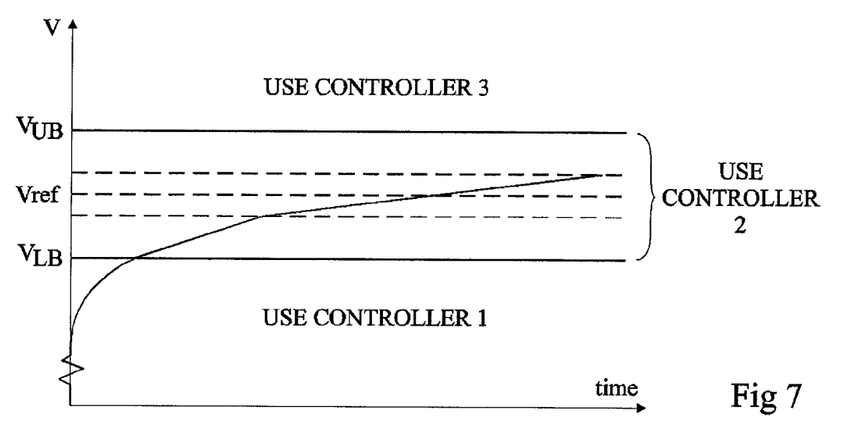
FIG. 7 is a graph illustrating voltage ranges of the control circuitry according to the present invention.

FIG. 7 is a graph showing an example of voltage ranges when each controller is selected, and an example of the output voltage Vout over a period of time. As illustrated, in a first range below a lower voltage boundary $V_{LB}$ a first controller is selected. The first controller is for example a loop-up table controller or a fuzzy logic controller according to FIGS. 3 and 5 respectively described above. In a second voltage range between the lower voltage boundary $V_{LB}$ and an upper voltage boundary $V_{UB}$, a second controller is selected. The second controller is for example a dither control circuit according to FIGS. 4A and 4B described above. As illustrated, within the second voltage range, the dither control circuit defines additional sub-ranges in which different rates of dither are applied, as described above. In a third voltage range above $V_{UP}$, a third controller is selected. The third controller is for example a loop-up table or fuzzy controller according to FIGS. 3 and 5 respectively. In some embodiments the first and third controllers could be combined such that a single controller is selected in both the first and third voltage ranges.

Figure 8:
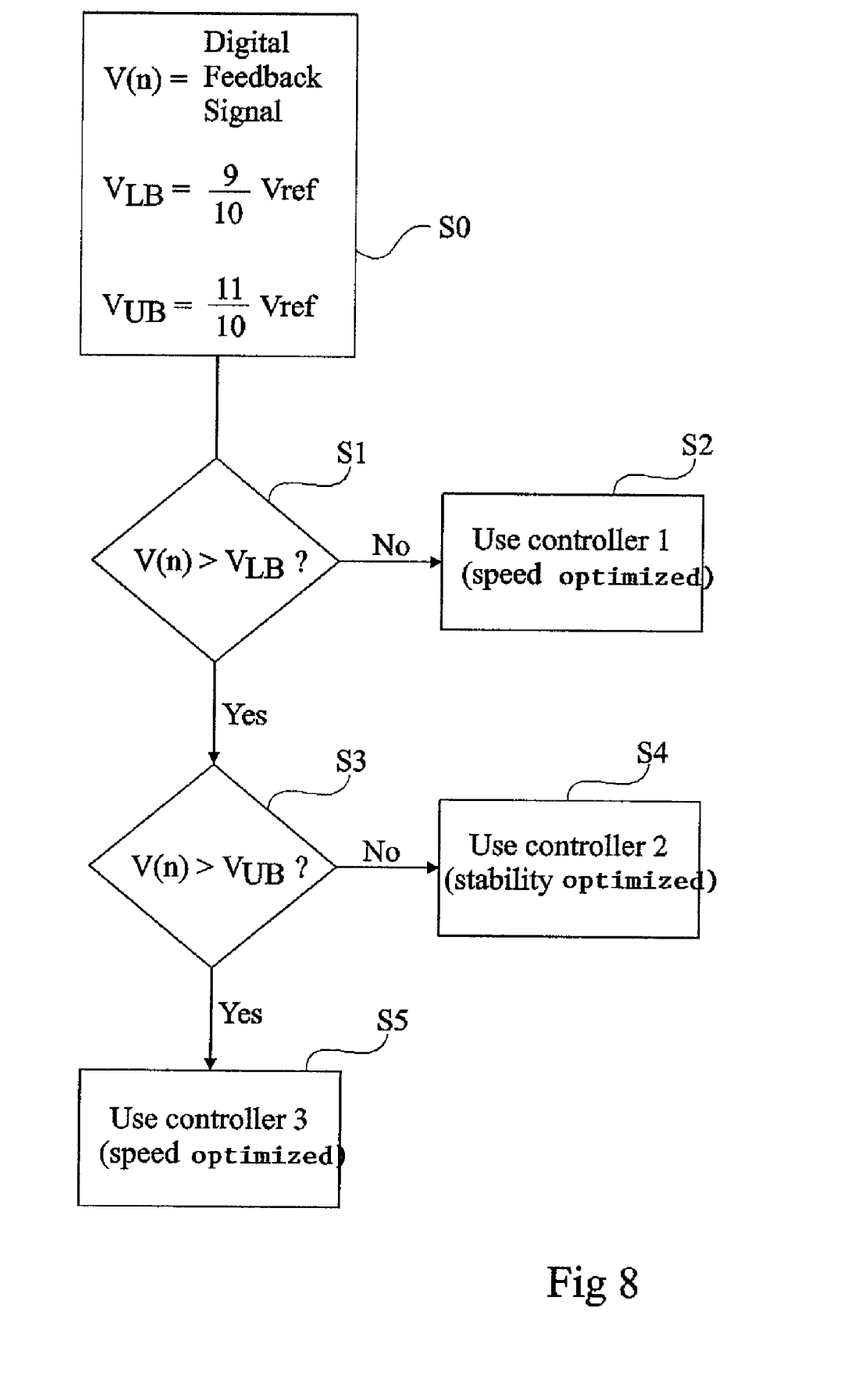
FIG. 8 is a flow diagram illustrating successive steps in a method of regulating a DC voltage level according to an embodiment of the present invention.

FIG. 8 is a flow diagram showing steps performed by controller determination block 602 of FIG. 6. As shown, in an initial step S0, parameters are defined, these parameters for example being stored in registers. In particular, the output voltage of the DC converter is defined as V(n), the lower voltage range is defined, in this example as 9/10 Vref, and the upper voltage range is defined, in this example 11/10 Vref. The next step is S1.

In S1, it is determined whether V(n) is greater that VLB. If not, then the next step is S2 in which the first controller is selected, which is preferably a controller having a relatively high speed. If it is, then the next step is S3.

In S3, it is determined whether V(n) is greater than VUB. If not, then the next step is S4, in which the second controller is used, which is preferably a controller being relatively stable. If it is, then the next step is S5, in which the third controller is selected, the third controller preferably being chosen to have a relatively high speed.

A control circuitry for a DC converter has been described which advantageously uses a plurality of different controllers to generate a control signal, the controller selected based on the voltage at the output of the DC converter. Each controller uses a control method that uses the output voltage as a parameter in generating the control signal. Thus depending on the particular voltage value within each the voltage range, different control signals can be generated, and stability when passing from one range to the next is improved.

Figure 9A:
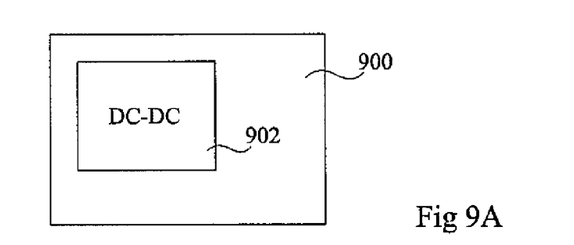
FIG. 9A illustrates a device comprising a DC converter according to an embodiment of the present invention.

Control circuitry as described herein can be incorporated in a wide range of DC converters used in various devices as represented by device 900 of FIG. 9A, which comprises a DC converter 902, and could be any device, such as a laptop computer, mobile phones, media players, personal digital assistants (PDA) etc.

Having thus described at least one illustrative embodiment of the invention, various alterations, modifications and improvements will readily occur to those skilled in the art.

Figure 9B:
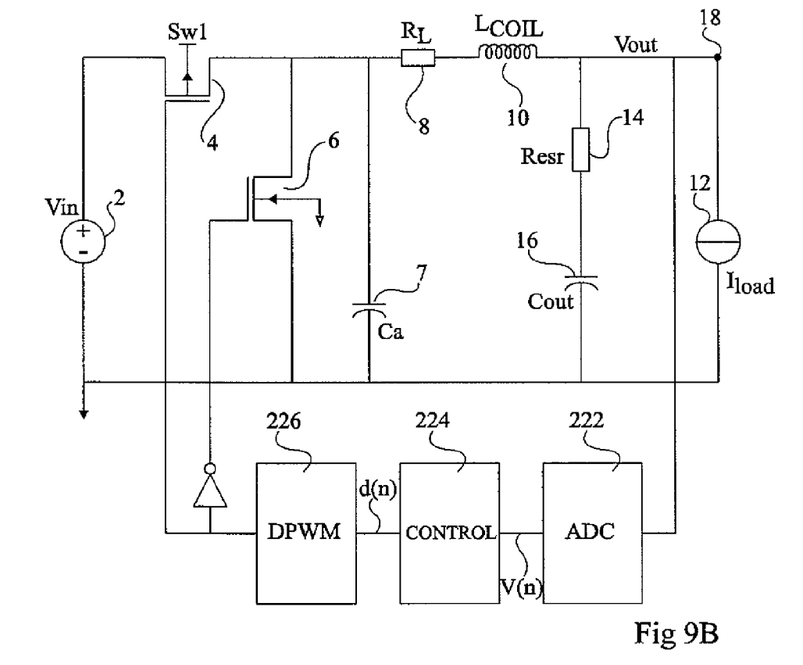
FIG. 9B illustrates a DC converter comprising a buck converter according to an embodiment of the present invention.
Figure 9C:
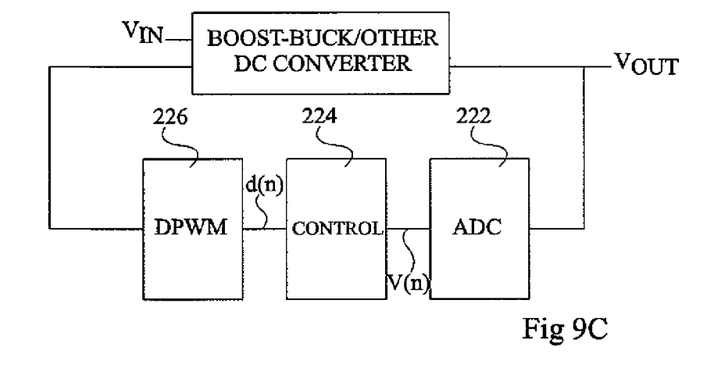
FIG. 9C illustrates a DC converter comprising a boost-buck converter or other DC converter according to an embodiment of the present invention.

For example, while embodiments been described in relation to a particular boost DC converter circuit, alternatively the control circuitry could be used to control other DC converters, such as buck converters, for example the buck converter of FIG. 1 having the control signal provided to transistor 4 and an inverse of this signal provided to transistor 6, or as represented in FIG. 9B. It could also be used to control boost-buck converters, or other DC converters as represented in FIG. 9C.

While embodiments of the control circuitry described above have two voltage boundaries, and thus three voltage ranges in which different controllers can be selected, in alternative embodiments more or less voltage boundaries and ranges could be provided, depending on the circuit that is to be controlled, and the load of the converter. For example, if the nature of the load is such that the output voltage rarely exceeds the reference voltage, but is often below the reference voltage, one boundary could be provided at a voltage lower then the reference voltage to ensure a quick rise time and stable operation close to the reference voltage.

Such alterations, modifications and improvements are intended to be within the spirit and scope of the invention. Accordingly, the foregoing description is by way of example only and is not intended to be limiting. The invention is limited only as defined in the following claims and the equivalent thereto.

What is claimed is:

1. A method of controlling at least one transistor of a DC voltage converter to regulate an output voltage of the DC converter, the method comprising:
    determining whether the output voltage of the DC converter is within a first or second voltage range;
    if said output voltage is within said first voltage range, generating a first control signal using a first control method performed by a first controller, said first controller receiving a first feedback signal indicative of the output voltage and determining the first control signal for restoring a desired output voltage value, the first control signal based on a value of the first feedback signal; and
    if said output voltage is within said second range, generating a second control signal using a second control method performed by a second controller, said second controller receiving the output voltage and determining the second control signal for restoring the desired output voltage value, the second control signal based on a value of the second feedback signal.

2. The method of claim 1, wherein the first control method comprises an element selected from the following group: a look-up table, fuzzy control, and a combination thereof.

3. The method of claim 1, wherein the first control method determines said control signal based on an error signal equal to a difference between said output voltage and a desired value of the output voltage.

4. The method of claim 1, wherein the second control method comprises the use of dither control.

5. The method of claim 1, further comprising providing a pulse width modulated control signal to said transistor, the pulse width modulated control signal determined by the first or second control signal.

6. Digital control circuitry adapted for controlling at least one transistor of a DC voltage converter and regulating the output voltage of the DC converter, the digital control circuitry comprising:
    a controller determination block configured to determine whether an output voltage of the DC converter is within a first or second voltage range;
    a first control block configured to receive a first feedback signal indicative of said output voltage, and to generate, when the output voltage is in said first voltage range, a first control signal for restoring a desired output voltage value, the first control signal based on a value of the first feedback signal; and
    a second control block configured to receive a second feedback signal indicative of said output voltage, and to generate a second control signal for restoring the desired output voltage value, the second control signal based on a value of the second feedback signal.

7. The digital control circuitry of claim 6, wherein the first control block comprises an element selected form the group consisting of: a look-up table, fuzzy logic, and a combination thereof.

8. The digital control circuitry of claim 7, wherein the second control signal comprises a dither control signal.

9. The digital control circuitry of claim 6, further comprising a pulse width modulator configured to provide a pulse width modulated signal to said transistor.

10. A DC voltage converter for boosting a voltage comprising the digital control circuitry of claim 6.

11. A DC voltage converter comprising:
    a controller determination block adapted to determine which voltage range of a plurality of voltage ranges an output voltage of the DC voltage converter falls within;
    a first feedback control circuit, configured to generate a first control signal for restoring a desired output voltage value of the converter, the first control signal based on a value of a first feedback signal; and
    a second feedback control circuit, configured to generate a second control signal for restoring the desired output voltage value of the converter, the second control signal based on a value of a second feedback signal;
    wherein the controller determination block is adapted to activate the first feedback control circuit or the second feedback control circuit depending on which voltage range the output voltage of the DC voltage converter falls within.

12. The DC voltage converter of claim 11, wherein the first and second feedback control circuits are configured to operate independently of each other.

13. The DC voltage converter of claim 11, wherein the controller determination block is adapted to receive a reference voltage value relating to the output voltage.

14. The DC voltage converter of claim 11, the first feedback control circuit comprising an element selected from the group consisting of: a look-up table, a fuzzy logic circuit, and a combination thereof.

15. The DC voltage converter of claim 11, the DC voltage converter comprising a converter selected from the group consisting of: buck converter, boost converter, and buck-boost converter.

16. The DC voltage converter of claim 11, wherein the DC voltage converter is incorporated in a device selected from the group consisting of: a computer, a mobile communication device, a media player, and a personal digital assistant.

17. The DC voltage converter of claim 11, wherein the controller determination block is adapted to provide a signal representative of the output voltage of the DC voltage converter to the activated first or second feedback control circuit.

18. The DC voltage converter of claim 17, wherein the first or second feedback control circuit is adapted to generate a control signal based on the value of the signal representative of the output voltage of the DC voltage converter.

19. The DC voltage converter of claim 18, wherein the control signal is provided to control a pulse width modulator for controlling at least one transistor of the DC voltage converter.

20. The DC voltage converter of claim 19, wherein the second feedback control circuit comprises a dither control circuit.

21. The DC voltage converter of claim 20, wherein the dither control circuit comprises:
    a dither logic block configured to provide one or plural duty cycle values in a group for the control signal; and
    a register configured to provide a previous group of duty cycle values to the dither logic block, wherein
    the dither logic block determines the one or plural duty cycle values based upon the previous group of duty cycle values and the signal representative of the output voltage of the DC voltage converter.

22. The DC voltage converter of claim 20, wherein the dither control circuit is adapted to perform dithering at a speed determined by the value of the signal representative of the output voltage of the DC voltage converter.

23. The DC voltage converter of claim 20, wherein the dither control circuit is adapted to provide a continuous mode of operation, a slow dither mode of operation, and a fast dither mode of operation, each mode of operation selected based on the value of the signal representative of the output voltage of the DC voltage converter.

24. The DC voltage converter of claim 23 configured such that the continuous mode of operation is provided when the signal representative of the output voltage of the DC voltage converter corresponds to an output voltage of the DC voltage converter within a voltage range having a value between about ±0.1 percent and about ±5 percent of a reference voltage value and the signal for controlling a pulse width modulator does not change when the dither control circuit provides a continuous mode of operation.

25. The DC voltage converter of claim 11, the first feedback control circuit comprising:
   a plurality of look-up tables;
   a plurality of buffers; and
   an adder.

26. The DC voltage converter of claim 25, wherein the adder is configured to add at least a previous duty cycle value to one value obtained from the plurality of look-up tables, the one value obtained based on a current or previous error value, the error value representative of an error between the output voltage of the DC voltage converter and a selected reference voltage.

27. The DC voltage converter of claim 11, the first feedback control circuit comprising a fuzzy controller adapted to receive as input a signal representative of a current error value and a signal representative of a difference between the current error value and a previous error value, each error value representative of an error between the output voltage of the DC voltage converter and a selected reference voltage.

28. A method for controlling the output voltage of a DC voltage converter comprising:
   determining, by a controller determination block, which voltage range of a plurality of voltage ranges the output voltage of the DC voltage converter falls within; and
   activating, responsive to determining that the output voltage falls within a first voltage range, a first feedback control circuit configured to restore an operating voltage according to a first method; and
   activating, responsive to determining that the output voltage falls within a second voltage range, a second feedback control circuit configured to restore the operating voltage according to a second method.

29. The method of claim 28, wherein the first and second feedback control circuits are configured to operate independently of each other.

30. The method of claim 28 further comprising receiving, by the controller determination block or the first or second feedback control circuits, a reference voltage value relating to the output voltage.

31. The method of claim 28, the first feedback control circuit comprising an element selected from the group consisting of: a look-up table, a fuzzy logic circuit, and a combination thereof.

32. The method of claim 28, the DC voltage converter comprising a converter selected from the group consisting of: buck converter, boost converter, and buck-boost converter.

33. The method of claim 28 wherein the DC voltage converter is incorporated in a device selected from the group consisting of: a computer, a mobile communication device, a media player, and a personal digital assistant.

34. The method of claim 28 further comprising providing, by the controller determination block, a signal representative of the output voltage of the DC voltage converter to the activated first or second feedback control circuit.

35. The method of claim 34 further comprising generating, by the first or second feedback control circuit, a control signal based on the value of the signal representative of the output voltage of the DC voltage converter.

36. The method of claim 35, wherein the control signal is provided to control a pulse width modulator for controlling at least one transistor of the DC voltage converter.

37. The method of claim 34, wherein the second feedback control circuit comprises a dither control circuit.

38. The method of claim 37, wherein the dither control circuit comprises:
   a dither logic block configured to provide one or plural duty cycle values in a group for the control signal; and
   a register configured to provide a previous group of duty cycle values to the dither logic block, wherein
   the dither logic block determines the one or plural duty cycle values based upon the previous group of duty cycle values and the signal representative of the output voltage of the DC voltage converter.

39. The method of claim 37, wherein the dither control circuit is further adapted to perform dithering at a speed determined by the value of the signal representative of the output voltage of the DC voltage converter.

40. The method of claim 37, wherein the dither control circuit is adapted to provide a continuous mode of operation, a slow dither mode of operation, and a fast dither mode of operation, each mode of operation selected based on the value of the signal representative of the output voltage of the DC voltage converter.

41. The method of claim 40, wherein the continuous mode of operation is provided when the signal representative of the output voltage of the DC voltage converter corresponds to an output voltage of the DC voltage converter within a voltage range having a value between about ±0.1 percent and about ±5 percent of a reference voltage value and the signal for controlling a pulse width modulator does not change when the dither control circuit provides a continuous mode of operation.

42. The method of claim 28, the first feedback control circuit comprising:
   a plurality of look-up tables;
   a plurality of buffers; and
   an adder.

43. The method of claim 42 further comprising adding, by the adder, at least a previous duty cycle value to one value obtained from the plurality of look-up tables, the one value obtained based on a current or previous error value, the error value representative of an error between the output voltage of the DC voltage converter and a selected reference voltage.

44. The method of claim 28, wherein the first feedback control circuit comprises a fuzzy controller, and further comprising:
   receiving, by the fuzzy controller, a signal representative of a current error value and a signal representative of a difference between the current error value and a previous error value, each error value representative of an error between the output voltage of the DC voltage converter and a selected reference voltage.

* * * * *